Feb. 26, 1952 J. M. GOLDBERG 2,587,462
FISHING REEL
Filed Oct. 24, 1949 2 SHEETS—SHEET 1
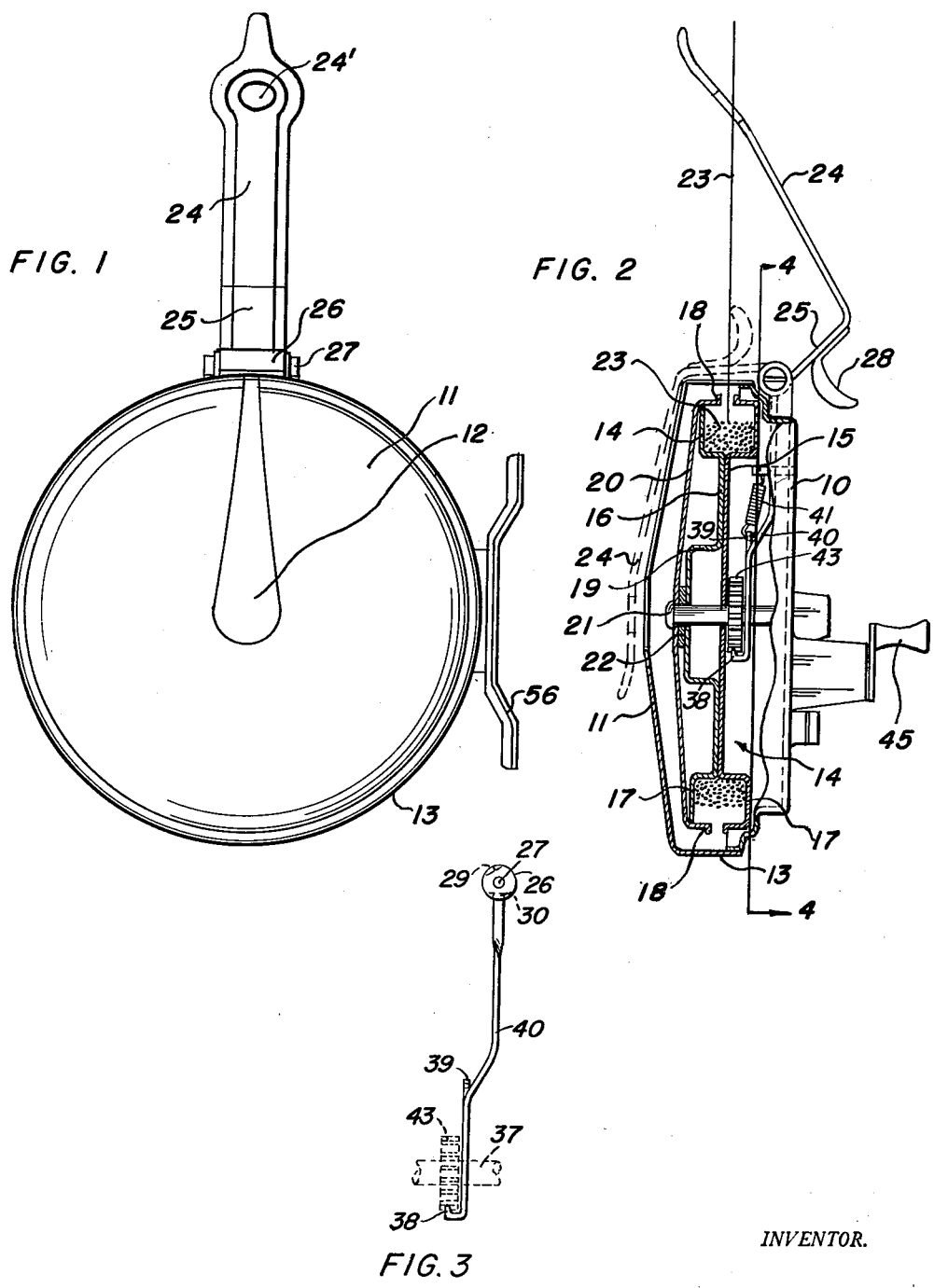
INVENTOR.
BY JACOB M. GOLDBERG
Bertha L. MacGregor

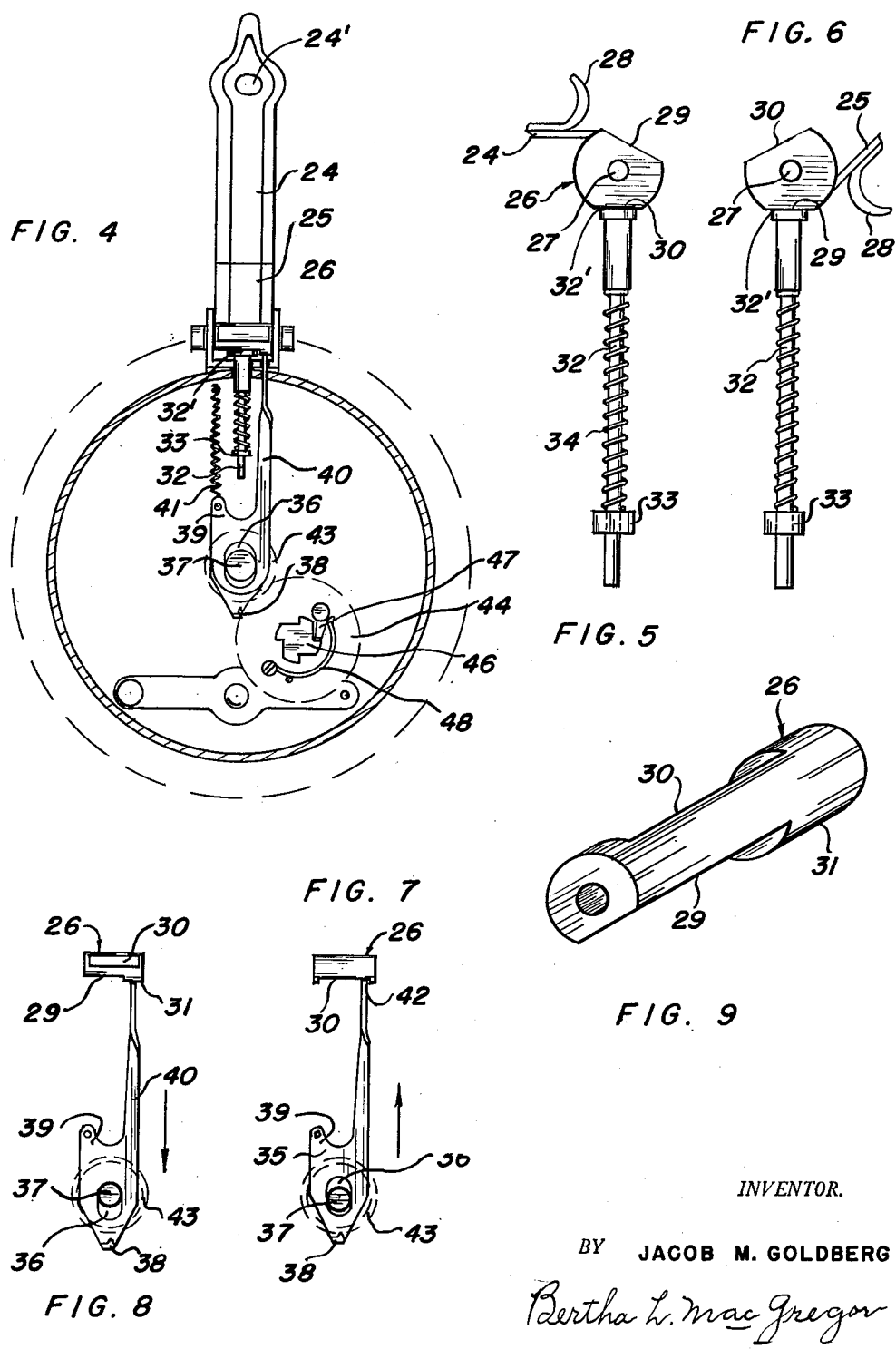

Patented Feb. 26, 1952

2,587,462

UNITED STATES PATENT OFFICE 2,587,462

FISHING REEL

Jacob M. Goldberg, Denver, Colo.

Application October 24, 1949, Serial No. 123,278

11 Claims. (Cl. 242—84.5)

This invention relates to fishing reels, and particularly to certain improvements in the type of fishing reel shown and described in my co-pending application, Serial No. 113,011, filed August 29, 1949, which has issued into Patent No. 2,571,440, dated October 16, 1951, of which this is a continuation-in-part.

The main object of this invention is to provide improved means for controlling the line during the casting and retrieving operations required in the art of fishing.

An important feature of this improvement is the spool construction whereby the line is prevented from undesirably free unwinding from the spool and consequent tangling of the line, but without impairing the frictionless passage of the line from the spool, without rotation of the spool.

Another important feature of construction is the means for locking the spool against rotation. The provision of such spool locking means eliminates all possibility of back lash. The spool locking means functions automatically to lock the spool in stationary position when the line guiding and controlling means are in the casting position, and functions automatically to unlock the spool and to permit rotation thereof when the line guiding and controlling means are in line retrieving position.

Another object of the invention is to prevent counter-clockwise rotation of the spool.

The advantages of these improvements will be apparent from the drawings and following specification.

In the drawings:

Fig. 1 is an elevational view of a fishing reel embodying my invention, showing the side which usually faces the left hand of the fisherman, with the line control member in retrieving position.

Fig. 2 is a peripheral elevational view of the same, the line control member being shown in casting position in dotted lines and in retrieving position in full lines.

Fig. 3 is a detached view of the gear and gear locking means, showing the parts as they appear at right angles to the position shown in Fig. 7.

Fig. 4 is a vertical sectional view taken in the plane of the dotted line 4—4 on Fig. 2.

Fig. 5 is an elevational view on an enlarged scale of the mechanism which retains the line control member in selected position, this view showing it in casting position.

Fig. 6 is a view similar to Fig. 5 but showing the same parts in retrieving position.

Fig. 7 is an elevational view of the gear locking means detached from the rest of the mechanism, showing said locking means in casting position.

Fig. 8 is a view similar to Fig. 7 but showing the gear locking means in retrieving position.

Fig. 9 is a perspective view of the cam which is part of the line control mechanism.

The preferred form of fishing reel embodying my invention comprises a shallow cup shaped housing 10 and a removable cover 11 provided with a cut away portion or slot 12 which extends from the center of the cover radially and continues to and through the peripheral wall 13 of the cover 11. Within the housing 10, 11, is a spool 14 which consists of plates 15 and 16, provided with spaced annular line retaining walls 17. The wall 17 which is part of the plate 15 terminates in an inturned peripheral flange 18. The plates 15 and 16 are connected together and have surface contact with each other in that portion located radially inwardly of the line retaining portions 17 excepting at the center where the plate 16 is provided with an outwardly cupped portion 19 spaced from the plate 15. A circular plate 20 also provided with an inturned peripheral flange 18, is fastened to the spool 14 by means of a screw 21 which extends through the plate 20, spacer 22, cupped member 19 of plate 16 and into the plate 15. The provision of the peripheral flanges 18 prevent undesirable unwinding of the line 23 and consequent snarling of the line in the space between the plate 20 and the housing cover 11.

A line guide and control member 24 in the form of a flat strap is bent between its ends and provided with a grommet 24'. The end 25 is hinged to the housing cover 11 by means of a cam 26 connected to the part 25 of the line control member 24, the cam being rotatable about the pin 27 fixedly mounted on the cover 11. The part 25 is provided with a finger hold 28 for actuating the hinged member 24.

The cam 26 is in the form of a relatively short round shaft, provided with a flat surface 29 and another flat surface 30. The cam surface 30 extends the length of the cam 26 between its ends, being parallel to the axis of the cam, whereas the cam surface 29 is shorter and terminates at the shoulder formed by the concentric portion 31 adjacent the end of said cam surface 29. The function of this cam 26 and its flat surfaces 29 and 30 will be explained hereinafter.

Referring to Figs. 5 and 6, it will be seen that when the line guide and control member 24 is in casting position, that is, with the portion 25 parallel to the peripheral surface 13 of the housing and the portion 24 engaging the housing 11, the flat or low cam surface 30 engages the flat top portion 32' of a lock pin 32 which slides through a bearing 33 fixed to a bracket (not shown) mounted in the housing 10.

The lock pin 32 is under tension of the spring 34 which surrounds the pin 32 between the bearing 33 and the enlarged portion 32' of the pin, and thus the lock pin is urged into contact with the cam 26 at all times. When the line guide and control member 24 has been manually moved to retrieving position, as in Fig. 6, and as shown in full lines in Fig. 2, the flat or low cam surface 29 will be engaged by the end 32' of the lock pin 32. The function of the lock pin is to retain the cam 26, and thereby the line guide and control member 24, in either the casting or the line retrieving position.

Referring to Figs. 7 and 8, and also to the assembled parts as shown in Fig. 4, it will be seen that in Fig. 7 the cam 26 is in the position corresponding with that of Fig. 5, in which the line guide member 24 is in casting position and the cam surface 30 engages the lock pin 32. The cam controls the position of a gear lock 35 whereby the spool is prevented from rotating when the line guide 24 is in casting position.

The gear lock 35 is a relatively flat piece of metal provided with an elongated slot 36 adapted to have the spool shaft 37 extend therethrough. Said gear lock 35 is provided with a gear engaging tooth 38, a short arm 39 and a longer arm 40. As shown in Fig. 4, a coiled spring 41 is connected to the arm 39 at one end and to a fixed part of the housing 10 at the other end. The gear lock arm 40 terminates in a cam bearing end 42. When the cam 26 has been moved with the line guide 24 to the casting position, the cam surface 30 will be engaged by the bearing end 42 of the gear arm 40 as shown in Fig. 7, and when the cam 26 has been moved with the line guide 24 to the retrieving position, the round or high portion 31 of the cam will be engaged by the bearing end 42 of the gear lock arm 40 as shown in Fig. 8. Thus the tooth 38 is made to engage the gear 43 fixed on the spool shaft 37 for locking the gear against rotation for casting purposes and the tooth 38 is made to disengage the gear 43 to allow said gear to rotate the spool for retrieving purposes. When the reel is positioned for casting the gear lock is in contact with the flat of the cam which allows the spring to urge the lock member 35 upwardly and to engage the tooth 38 in the spool gear.

The spool shaft 37 and gear 43 are driven through a gear 44 mounted in the casing in any suitable manner, the gear 44 being actuated by the handle 45 operatively connected with said gear 44. The gear 44 can rotate only in a clockwise direction for the purpose of rewinding the line 23 on the spool 14 by rotating the spool. The mechanism for preventing counter-clockwise movement of the gear 44 and spool 14 comprises a ratchet 46 fixed on the face of the gear 44, a pawl 47 pivotally mounted on the gear in juxtaposition to the ratchet, and a spring 48 for bearing on the pawl. The pawl 47 is under constant spring pressure and therefore engages the ratchet 46, allowing the gear 44 to turn only in a clockwise direction. A rod rest 56 is attached to the housing.

*Operation.*—From the foregoing it will be clear that the line guide or control 24 is moved manually by the fisherman to either casting or retrieving position as required. In casting position, it embraces the casing member 11, and the line 23 passes through the space between spool flanges 18, over the spool plate 20 into the space between the spool and slotted housing 11, to emerge through the central part 12 of the slot and grommet 24' of the line control 24.

In this position of the line control 24, the cam 26 is engaged by the lock pin 32 bearing on the cam surface 30 as shown in Fig. 5, and at the same time the cam surface 30 is engaged by the gear lock arm 42 in the manner shown in Fig. 7. Under influence of the spring 41, the gear lock 35 is in its raised position, wherein the tooth 38 engages the gear 43 and prevents its rotation and consequently also prevents rotation of the shaft 37 and spool 14. Thus, during the casting operation, the line 23 "rolls off" the spool freely and without friction as is desirable for easy casting, and without rotation or operation of any of the parts of the mechanism. Only the outermost coils of the line pass through the space between the flanges 18 of the spool, and undesired, too quick passing out of the spool over its side into the space between spool and housing is prevented.

When the fisherman desires to retrieve the line 23, he moves the line control 24 to the extended position shown in Figs. 1, 2 and 4, wherein the line 23 is drawn out in a radial direction from the spool 14 between the flanges 18. In this position of the line control 24, the cam 26 is engaged by the lock pin 32 bearing on the low cam surface 29 as shown in Fig. 6, and at the same time the high cam surface 31 is engaged by the arm 42 of the gear lock 35 in the manner shown in Fig. 8. The cam thus forces the gear lock 35 downwardly with respect to the shaft 37 which extends through the elongated slot 36, and the lock tooth 38 is disengaged from the gear 43. This leaves the gear free to rotate, but only in a clockwise direction due to the presence of the ratchet and pawl control as heretofore described.

I claim:

1. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, and a cam actuated by the line control member for moving said gear locking means into and out of gear engaging position.

2. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, a cam actuated by the line control member for moving said gear locking means into and out of gear engaging position, and means mounted in the housing engaging the cam for retaining it in either of its two positions.

3. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, a cam actuated by the line control member for moving said gear locking means into and out of gear engaging position, and spring pressed means mounted in the housing engaging the cam and retaining the hinged line control member in casting or retrieving position.

4. A fishing reel comprising a housing, a line carrying spool, a spool shaft rotatably mounted in the housing, said housing being provided with a slot through which the line can be withdrawn, a line control member hingedly mounted on the housing, a drive gear on the shaft operatively connected with the spool, a slotted plate mounted in the housing, the spool shaft extending through said slotted plate, a gear engaging tooth on the plate, and a cam actuated by the line control member for moving said slotted plate relatively to said shaft and thereby moving said gear engaging tooth into and out of gear engaging position.

5. A fishing reel comprising a housing, a line carrying spool, a spool shaft rotatably mounted in the housing, said housing being provided with a slot through which the line can be withdrawn, a line control member hingedly mounted on the housing, a drive gear on the shaft operatively connected with the spool, a slotted plate mounted in the housing, the spool shaft extending through said slotted plate, a gear engaging tooth on the plate, a cam actuated by the line control member for moving said slotted plate relatively to said shaft and thereby moving said gear engaging tooth into and out of gear engaging position, and spring pressed means mounted in the housing engaging the cam for retaining it in either of its two positions.

6. A fishng reel comprising a housing, a line carrying spool, a spool shaft rotatably mounted in the housing, said housing being provided with a slot through which the line can be withdrawn, a line control member hingedly mounted on the housing, a drive gear on the shaft operatively connected with the spool, a slotted plate mounted in the housing, the spool shaft extending through said slotted plate, a gear engaging tooth on the plate, a cam actuated by the line control member for moving said slotted plate relatively to said shaft and thereby moving said gear engaging tooth into and out of gear engaging position, and spring means connected to said slotted plate and housing for urging the plate into cam engaging position and said tooth into gear engaging position.

7. A fishing reel comprising a housing, a line carrying spool, a spool shaft rotatably mounted in the housing, said housing being provided with a slot through which the line can be withdrawn, a line control member hingedly mounted on the housing, a drive gear on the shaft operatively connected with the spool, gear locking means mounted in the housing, a ratchet connected to the gear, a pawl cooperating with the ratchet for preventing rotation of the gear in one direction, and a cam actuated by the line control member for moving said gear locking means into and out of gear engaging position.

8. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, a cam actuated by the line control member for moving said gear locking means into and out of gear engaging position, and means mounted in the housing engaging the cam for retaining it in either of its two positions, said cam consisting of a shaft rigidly connected to the line control member and pivotally connected to the housing, said shaft having a flat surface parallel to its axis at one side engageable by said spring pressed means and by said gear locking means when the line control member is in casting position, and a shorter flat surface substantially opposite said first flat surface engageable by said spring pressed means when the line control member is in retrieving position.

9. A fishing reel comprising a housing, a line carrying spool, a spool shaft rotatably mounted in the housing, said housing being provided with a slot through which the line can be withdrawn, a line control member hingedly mounted on the housing, a drive gear on the shaft operatively connected with the spool, means for rotating the gear, shaft and spool in one direction, means for preventing rotation in the opposite direction, gear locking means mounted in the housing, and a cam actuated by the line control member for moving said gear locking means into and out of gear engaging position, said cam having a low surface which is engaged by said gear locking means when the line control member is in casting position whereby the gear is engaged by the locking means, and said cam having a high surface which forces the locking means out of gear engagement when the line control member is in retrieving position.

10. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, and a cam actuated by the line control member for moving said gear locking means into and out of gear engaging position, said line carrying spool comprising a web portion, spaced apart annular side walls located radially beyond the web portion, and inturned peripheral flanges on said side walls directed toward each other and defining a relatively narrow circumferential slot between them whereby the line is confined between said side walls and is withdrawable through said narrow slot in the spool and said slotted housing.

11. A fishing reel comprising a housing, a line carrying spool rotatably mounted in the housing, the housing being provided with a slot through which the line can be withdrawn, a line control member hingedly mounted on the housing, a drive gear operatively connected with the spool, gear locking means mounted in the housing, a cam actuated by the line control member for moving said gear locking means into and out of gear engaging position, and spring pressed means mounted in the housing engaging the cam and retaining the hinged line control member in casting or retrieving position, said line carrying spool comprising a web portion, spaced apart annular side walls located radially beyond the web portion, and inturned peripheral flanges on said side walls directed toward each other and defining a relatively narrow circumferential slot between them whereby the line is confined between said side walls and is withdrawable through said narrow slot in the spool and said slotted housing.

JACOB M. GOLDBERG.

REFERENCES CITED

The following references are of record in the file of this patent:

UNITED STATES PATENTS

| Number | Name | Date |
|---|---|---|
| 161,314 | Winans et al. | Mar. 23, 1875 |
| 459,511 | Loomis | Sept. 15, 1891 |
| 1,547,297 | Case | July 28, 1925 |
| 1,697,850 | Case | Jan. 8, 1929 |
| 2,200,779 | Polikoff et al. | May 14, 1940 |

FOREIGN PATENTS

| Number | Country | Date |
|---|---|---|
| 8,517 | Great Britain | of 1910 |